United States Patent
Grethel

(10) Patent No.: US 8,157,541 B2
(45) Date of Patent: Apr. 17, 2012

(54) MOUNTING ARRANGEMENT FOR MOUNTING A PEDAL FORCE SERVOMECHANISM ON A VEHICLE STRUCTURE

(75) Inventor: Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 975 days.

(21) Appl. No.: 12/152,668

(22) Filed: May 14, 2008

(65) Prior Publication Data

US 2008/0283128 A1   Nov. 20, 2008

Related U.S. Application Data

(60) Provisional application No. 60/930,280, filed on May 15, 2007.

(51) Int. Cl.
*F16L 5/00* (2006.01)
(52) U.S. Cl. ........ 417/363; 248/300; 403/326; 137/354; 137/565.24; 267/163
(58) Field of Classification Search ............. 137/565.24, 137/351, 899, 354; 303/114.1, 114.3; 403/326, 403/329, 275, 280, 282; 267/163, 164, 165; 248/300; 251/129.11, 295; 417/363
See application file for complete search history.

(56) References Cited

U.S. PATENT DOCUMENTS 4,601,378 A * 7/1986 Pierce et al. .................. 192/115
4,793,377 A * 12/1988 Haynes et al. ........... 137/625.65

* cited by examiner

*Primary Examiner* — John Rivell
*Assistant Examiner* — R. K. Arundale
(74) *Attorney, Agent, or Firm* — Alfred J. Mangels

(57) ABSTRACT

A mounting arrangement for a pedal force servomechanism assembly of a motor vehicle structure. The pedal force servomechanism assembly is provided with integrated screw connection points and can be fastened by screws to any vehicle structure in a particular vehicle application. It also provides that a static axial pressing of the components located within the unit, a hydraulic unit and a motor unit, is ensured. A holding plate is positioned between the opposed surfaces of those assembled units, and is provided both with through-holes for attaching the hydraulic unit to the motor unit, as well as with through-holes for attaching the assembly to the vehicle structure of the particular vehicle application. The holding plate is of resilient design in the axial direction in the clamping region between the hydraulic unit and the motor unit.

8 Claims, 2 Drawing Sheets

MOUNTING ARRANGEMENT FOR MOUNTING A PEDAL FORCE SERVOMECHANISM ON A VEHICLE STRUCTURE

BACKGROUND OF THE INVENTION

1. Field of the Invention

The present invention relates to a mounting arrangement for mounting a pedal force servomechanism on a vehicle structure. The servomechanism includes a motor unit and a hydraulic unit that are joined as an assembly with a holding plate.

2. Description of the Related Art

Pedal force servomechanisms usually installed in motor vehicles are devices that include a hydraulic unit and a motor unit and are joined together as an assembly. For the attachment of such assemblies to a vehicle structure in a vehicle application, mounting systems are known that include appropriate screw connection points provided on the pedal force servomechanism, by which a connection can be made to the vehicle structure by means of fastening elements. However, the screw connection points must be located on the pedal force servomechanism in such a way that they correspond to the local structural circumstances of the particular vehicle structure. Since the local structural circumstances of the vehicle structure are for the most part different for each vehicle application, the screw connection points for the pedal force servomechanism being used must always be relocated accordingly.

An object of the present invention is therefore to provide an inexpensive and easily-installed attachment arrangement for a pedal force servomechanism on a vehicle structure, wherein the pedal force servomechanism is provided with screw connection points such that the device can be screwed onto any vehicle structure of a vehicle application as an assembly, while at the same time static axial clamping of the assembled components, the hydraulic unit and the motor unit, is ensured.

SUMMARY OF THE INVENTION

The object is achieved with a mounting arrangement for a pedal force servomechanism on a vehicle structure, wherein the pedal force servomechanism includes as components a motor unit and a hydraulic unit. The components are joined together into an assembly by means of fastening elements. The two facing abutting surfaces of the two components become the connecting surface. To position the hydraulic unit relative to the motor unit, a cylindrical projection extends from the connecting surface of the hydraulic unit, with a diameter that is received in a correspondingly formed recess in the connecting surface of the motor unit. To attach that assembly to a vehicle structure in a vehicle application, a holding plate is inserted between the abutting connecting surfaces. The holding plate includes an opening that defines a receiving diameter that is matched to the diameter of the cylindrical projection of the hydraulic unit, and thus it can be received by that component. Furthermore, the holding plate has through-holes that serve on the one hand for attachment of the holding plate to the vehicle structure and on the other hand for attachment to the hydraulic unit. In addition, the holding plate is so formed as to provide resilience in the axial direction in the region of the receiving diameter of the hydraulic unit.

The holding plate being clamped between the hydraulic unit and the motor unit and of appropriately resilient design makes it possible to achieve a static axial pressing of the two components, without overloading the seals situated in the interior of the unit. In addition, by means of the through-holes appropriately situated in the holding plate, the pedal force servomechanism is attachable to the particular vehicle structure as an assembly, so that only the arrangement of the through-holes on the holding plate must correspond to the local situation of the vehicle structure. In addition, the holding plate, which functions as an adapter between the pedal force servomechanism and the vehicle structure, has a simple design and therefore is also simple to produce. Since attaching the pedal force servomechanism to the vehicle structure requires only that the holding plate must be attached to the vehicle structure, that solution also reduces the cost of assembly.

In an advantageous design of the invention, the holding plate is provided with at least one through-hole, by which a connection can be made from the hydraulic unit to the motor unit by means of at least one fastening element. To fix the positions of all three components in the radial direction, however, it is useful to provide two through-holes in the holding plate.

It is also advantageous that the arrangement and size of the at least two through-holes situated in the holding plate, intended for attaching it to the vehicle structure, are matched to the local attaching options of that vehicle structure.

In another advantageous embodiment of the invention, the outer circumference of the receiving diameter of the holding plate is slotted multiple times to form segments. The resulting segments are assigned to various functions. At least three segments, with their receiving diameter matched to the diameter of the projection on the hydraulic unit, serve to position the holding plate on that component, the three segments preferably being at the same distance from each other. That minimizes the free play of the holding plate in the radial direction on the projection of the hydraulic unit, which contributes to simplifying the assembly. The other segments have other functions to fulfill. To that end they assume an angle relative to the body of the holding plate, so that they stand off from the surface of the holding plate. In that way those segments are assigned the function of spring elements through biasing. In the clamping process those spring elements serve to produce an additional clamping force, so that the holding force between the motor unit and the hydraulic unit is increased thereby, so that the shaft seal situated between the hydraulic unit and the motor unit is not overloaded, which contributes to increasing its service life. Moreover, the shaft seal is also prevented from twisting radially.

It is especially advantageous, and thus cost-effective, to integrate the function of the spring into the holding plate; that is, to design the holding plate as a diaphragm spring, for example.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
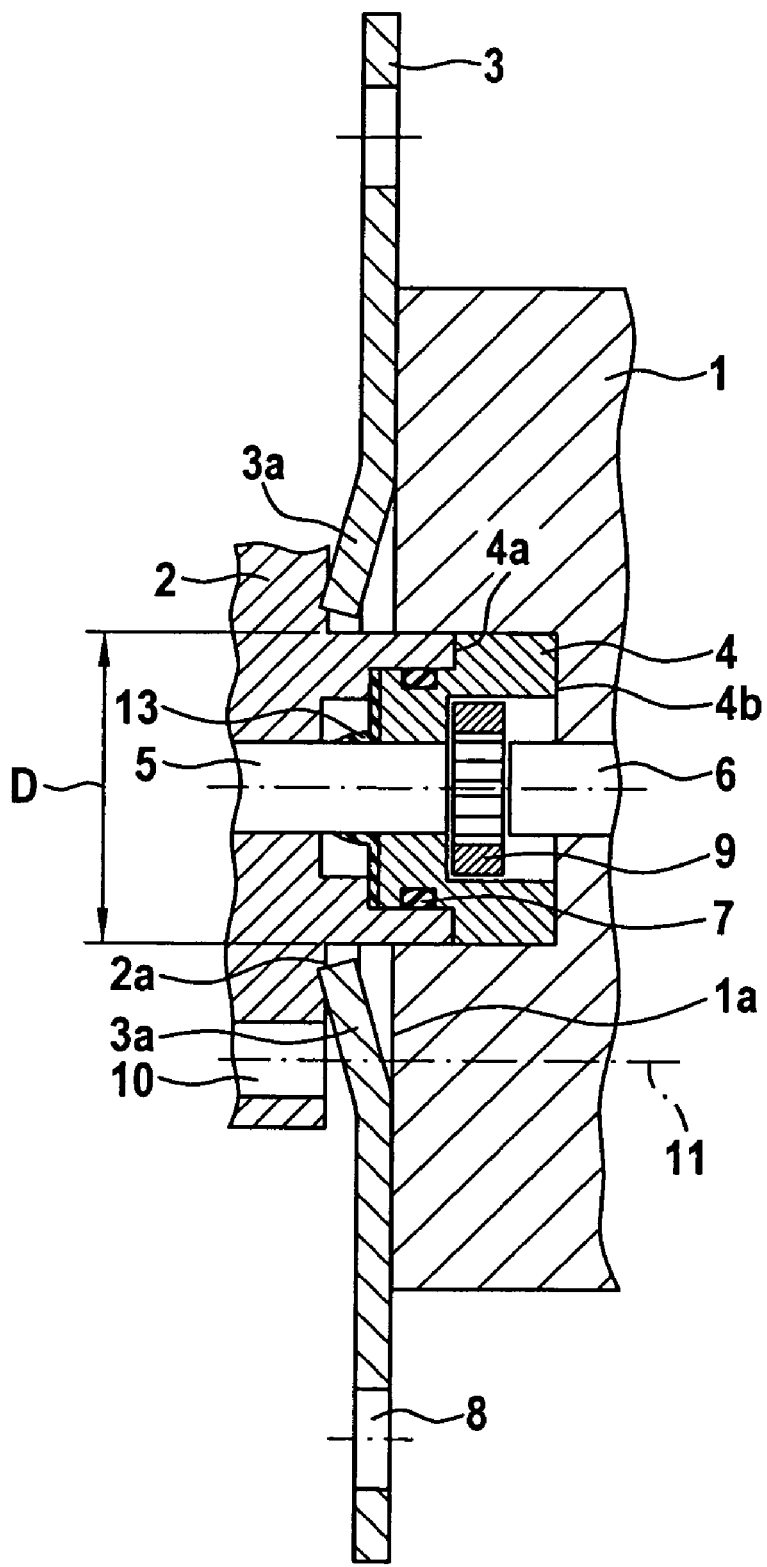
FIG. 1 is a fragmentary, cross-sectional view of the junction between a hydraulic unit and a motor unit of a pedal force servomechanism.

In the cross-sectional view in FIG. 1, the connection point between hydraulic unit 2 and motor unit 1 can be seen. In motor unit 1 a motor shaft 6 is bearing-mounted, on which a clamping flange 4 is situated, whose stop surface 4b rests against an inner surface of the housing of motor unit 1. The torque of the motor of motor unit 1 is transmitted to hydraulic unit 2 through the motor shaft, which is operatively connected to a clutch 9 mounted on its end. The pump shaft 5 in hydraulic unit 2 is bearing-supported in a corresponding position. The end of the pump shaft 5 is so designed that it also is operatively connected to clutch 9.

Also shown in FIG. 1 is a seal 13 that is situated on pump shaft 5. Seal 13 here is a shaft seal that is in the form of a cup seal. In addition, the outer periphery of clamping flange 4 is provided with another seal 7 in the form of an O-ring, which seals it with respect to a housing projection provided on hydraulic unit 2. In order to ensure that the two shafts 5 and 6 are arranged coaxially to each other after the two components 1 and 2 are assembled, a cylindrical housing projection extends from the connecting surface of hydraulic unit 2 and is received in a correspondingly-shaped recess in the connecting surface of motor unit 1, so that hydraulic unit 2 is positioned by means of that housing projection in motor unit 1 as it is supported. Clamping flange 4 includes an axial stop 4a for the housing projection of hydraulic unit 2, and clamping flange 4 also serves as a receptacle for the clutch 9. In addition, the seal 13, which is in the form of a cup seal, can bear against the outer face of clamping flange 4.

Additionally, through holes 10 are provided in hydraulic unit 2, which are intended for attaching the latter to motor unit 1. With the aid of suitable fastening elements 11, such as fastening screws, which engage threaded holes provided for that purpose in the housing of motor unit 1, the two components 1 and 2 are bolted together in the normal manner.

As shown in FIG. 1, a holding plate 3 is inserted between the connecting surfaces of the two components 1 and 2. Holding plate 3 includes a receiving diameter 12 (see FIG. 2) that engages and rests on the outer diameter D of the housing projection of hydraulic unit 2, and it includes a surface that bears on motor unit 1. In that way, holding plate 3 is held on the housing projection of hydraulic unit 2, secure against loss by the connection process that connects it to hydraulic unit 2, and after being connected it is clamped between the two components 1 and 2, in particular in the region of its receiving diameter 12. The through-holes 10 (see FIG. 2) are provided in holding plate 3 to provide the connection between hydraulic unit 2 and motor unit 1.

Because of the tolerance chain in the axial direction, brought about by the components involved in the connection, without some additional measure reliable clamping of holding plate 3 cannot be ensured without overloading the cup seal 13. For that reason, the periphery of the receiving diameter 12 of holding plate 3 is slotted multiple times in the radial direction, so that individual segments 14a, 14b result. To center holding plate 3 on the diameter D of the housing projection of hydraulic unit 2, it is advantageous to select three segments 14a that are separated from each other by an angle of 120°, with a receiving diameter 12 that is matched to the outer diameter D of the housing projection of hydraulic unit 2. The other resulting segments 14b are angled outwardly in the axial direction of receiving diameter 12, as can be seen in FIG. 2, so that in combination with the material chosen for the holding plate 3 they function as spring elements 3a.

In contrast to the segments 14a, which serve for centering holding plate 3 on the housing projection of hydraulic unit 2, segments 14b that function as spring elements 3a can be shorter in the radial direction of receiving diameter 12. In FIG. 1 spring elements 3a all extend in the same outward axial direction from holding plate 3. However, they can also extend alternately in opposite axial directions. Thus, in the region of the spring elements 3a, in the process of clamping against the end face of hydraulic unit 2, which serves as a contact surface when holding plate 3 is not present between hydraulic unit 2 and motor unit 1, a clamping surface 2a of hydraulic unit 2 is thus given a different function, and, likewise, on the opposite side, the outer end face of motor unit 1 is turned into the clamping surface 1a. The spring elements 3a of holding plate 3 thus serve to compensate for tolerances, while at the same time the transmission of a sufficient axial clamping force is ensured. However, the spring function can also be taken over by an additional separate component, such as a diaphragm spring, which is likewise inserted between hydraulic unit 2 and motor unit 1. A more elegant solution would be to integrate the function of the diaphragm spring directly into the holding plate 3. In that way another additional component is eliminated, which again affects the tolerance chain favorably.

When hydraulic unit 2 is connected to motor unit 1 by means of fastening elements 11, the clamping force is transmitted through clamping flange 4 to cup seal 13. At the same time, the stop surface 4b of clamping flange 4 bears against motor unit 1. With the aid of the spring elements 3a it is possible for the cup seal 13 to be clamped only to a predetermined degree, thereby avoiding overloading of the material of cup seal 13. As a result of the axial clamping of cup seal 13, aside from its desired sealing function, cup seal 13 is prevented from twisting. Since the clamping of cup seal 13 changes over its service life, and thus the static sealing effect cannot be ensured over its entire service life, the previously-mentioned additional seal 7 in the form of an O-ring is provided on the outer periphery of clamping flange 4.

Figure 2:
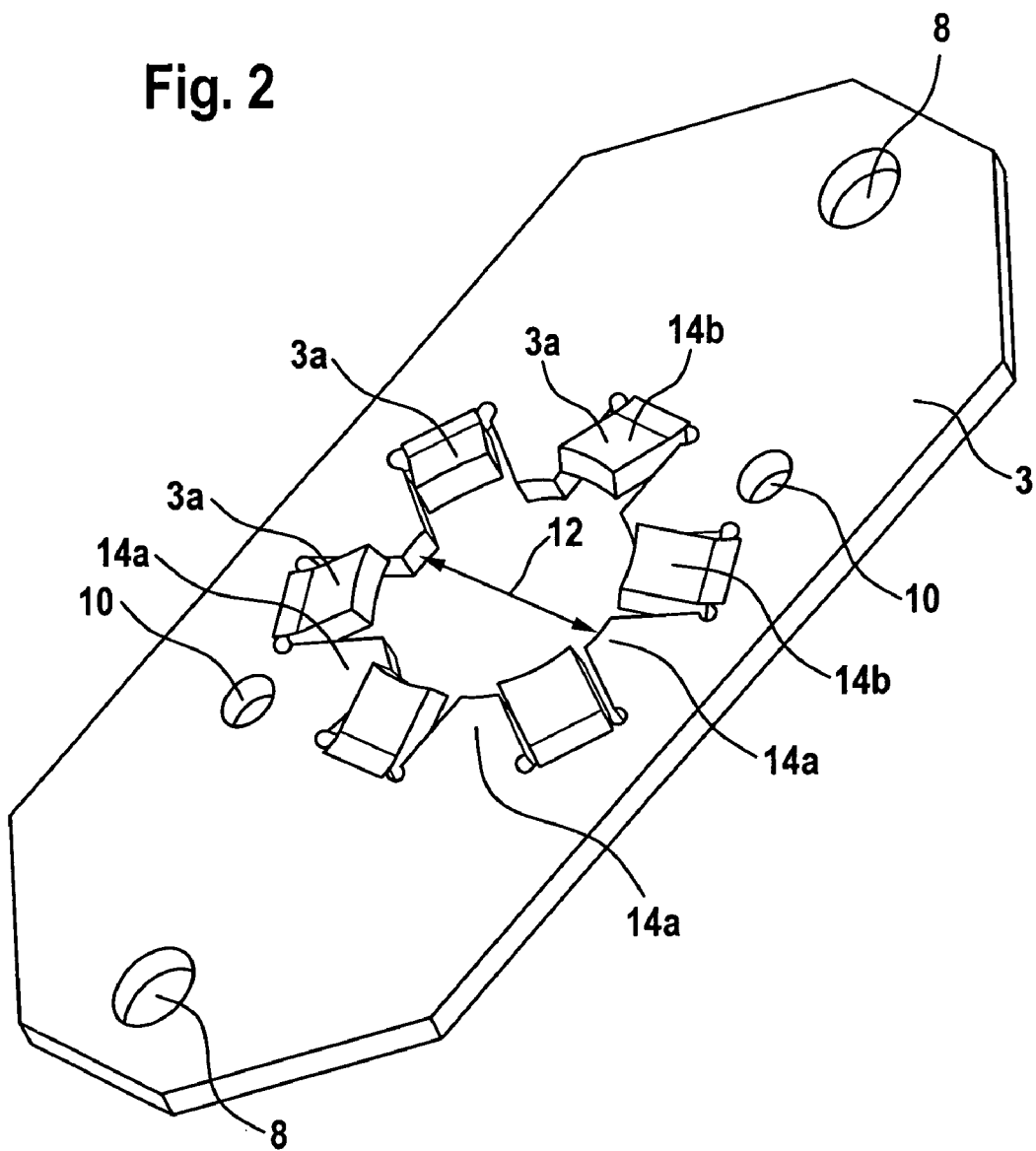
FIG. 2 is a top perspective view of an embodiment of a holding plate in accordance with the present invention.

FIG. 2 shows a top perspective view of holding plate 3. It can be seen that holding plate 3 includes a basic flat plate body, which preferably has a opening in its center, whose diameter, or receiving diameter 12, matches the diameter D of the housing projection of hydraulic unit 2. It is also possible to see in FIG. 2 the spring elements 3a, which are produced by radial incisions about the circumference of the receiving diameter 12 that form individual, radially-inwardly-extending segments 14a, 14b. By that division, however, in addition to preferably three radial segments 14a that are spaced from each other at intervals of 120°, all other segments 14b can have a larger diameter. The functions of those segments 14b are changed into spring elements 3a, since they extend outwardly from the surface of holding plate 3 in the axial direction of receiving diameter 12. Spring elements 3a can all extend in the same axial direction, or they can be offset alternately in opposite axial directions.

In addition, in FIG. 2 the through-holes 8 and 10 can be seen on holding plate 3. The through-holes 10 allow the fastening elements 11 to pass from hydraulic unit 2 through holding plate 3, in order to produce a screw connection with motor unit 1. The through-holes 8, in contrast, serve to attach the entire pedal force servomechanism as a unit to the vehicle structure. Therefore their number, arrangement, shape and size must be matched to the circumstances of construction space, or to the local circumstances of the particular vehicle structure. At the same time, it is also possible to design at least one of the through holes 8 as an elongated hole, for example, to compensate for tolerances.

The holding plate according in accordance with the present invention provides an inexpensive device for attaching a pedal force servomechanism, for example in the engine compartment of a motor vehicle, with which only the number, arrangement, and size of the through-holes 8 must be matched to the vehicle structure of the particular vehicle application. At the same time, it is also conceivable, depending upon the vehicle structure of the possible vehicle applications, to already drill a number of different through-holes 8 in holding plate 3, in which case only those through-holes intended for the particular vehicle structure would be used. On the other hand, the area of holding plate 3 that serves directly for mounting within the pedal force servomechanism can be designed the same for all vehicle applications, which makes its production very economical.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A mounting arrangement for mounting a pedal force servomechanism on a vehicle structure, said mounting arrangement comprising: a motor unit and a hydraulic unit that are joined together as an assembly and have opposed faces that serve as clamping surfaces, the hydraulic unit including a housing having a cylindrical projection with a diameter D extending from a hydraulic unit clamping surface, wherein the cylindrical projection of the hydraulic unit is received and positioned within a recess provided in a motor unit clamping surface; and a holding plate having an aperture defining a receiving diameter that corresponds with diameter D of the cylindrical projection of the hydraulic unit housing, wherein the holding plate is positioned between the hydraulic unit and the motor unit clamping surfaces and includes at least one first through-hole for attaching the hydraulic unit to the motor unit, and second-through holes for attaching the assembly to a vehicle structure, and wherein the holding plate includes axially-extending spring means adjacent to the receiving diameter.

2. A mounting arrangement in accordance with claim 1, wherein the holding plate includes at least two first through-holes.

3. A mounting arrangement in accordance with claim 1, wherein the holding plate includes at least two second through-holes, wherein the second through-holes have a size and are positioned to correspond with an attachment region of a vehicle structure of a predetermined vehicle.

4. A mounting arrangement in accordance with claim 1, wherein the holding plate includes integral spring means that act against the hydraulic unit clamping surface.

5. A mounting arrangement in accordance with claim 1, wherein the receiving diameter of the holding plate includes a plurality of radially-outwardly extending incisions to form a plurality of radially-extending segments.

6. A mounting arrangement in accordance with claim 5, wherein at least three radially-extending segments are holding segments that engage an outer surface of the cylindrical projection of the hydraulic unit.

7. A mounting arrangement in accordance with claim 6, wherein the at least three radially-extending segments are equidistantly circumferentially spaced from each other.

8. A mounting arrangement in accordance with claim 5, wherein the radially-extending segments include a plurality of spring elements that extend outwardly from an outer face of the holding plate.

* * * * *